(12) United States Patent
Mueller et al.

(10) Patent No.: US 6,373,074 B1
(45) Date of Patent: Apr. 16, 2002

(54) DEVICE FOR READING OUT INFORMATION STORED IN A PHOSPHOR-CARRIER, AND AN X-RAY CASSETTE

(75) Inventors: Juergen Mueller, Munich; Herbert Gebele, Sauerlach; Thomas Zehetmaier, Neufam; Ralph Thoma, Augsburg, all of (DE)

(73) Assignee: Agfa-Fevaert Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/554,974
(22) PCT Filed: Nov. 24, 1998
(86) PCT No.: PCT/EP98/07570
 § 371 Date: May 23, 2000
 § 102(e) Date: May 23, 2000
(87) PCT Pub. No.: WO99/28765
 PCT Pub. Date: Jun. 10, 1999

(30) Foreign Application Priority Data

Nov. 28, 1997 (DE) .......................................... 197 52 925

(51) Int. Cl.⁷ ............................ G01T 1/29; H04N 1/031
(52) U.S. Cl. ......................... 250/584; 250/582; 250/585
(58) Field of Search ................................ 250/584, 581, 250/582, 585, 586, 487.1; 378/98.8

(56) References Cited

U.S. PATENT DOCUMENTS

| 4,816,679 A | 3/1989 | Sunagawa et al. ........ 250/327.2 |
| 4,922,103 A | 5/1990 | Kawajiri et al. ......... 250/327.2 |
| 4,999,497 A | 3/1991 | Funahashi et al. ....... 250/327.2 |
| 5,038,037 A | 8/1991 | Saotome ................... 250/327.2 |
| 5,864,146 A * | 1/1999 | Karellas ...................... 250/581 |

FOREIGN PATENT DOCUMENTS

| DE | 19506798 | 8/1996 |
| DE | 19506809 | 8/1996 |
| EP | 0213428 | 3/1987 |
| EP | 0482676 | 4/1992 |
| EP | 0777148 | 6/1997 |

* cited by examiner

Primary Examiner—Georgia Epps
Assistant Examiner—Richard Hanig
(74) Attorney, Agent, or Firm—Milde & Hoffberg, LLP

(57) ABSTRACT

The invention relates to a device (10,60) for reading out information stored in a phosphor carrier (15) and to an X-ray cassette (70) which contains the phosphor carrier (15) and such a device. The inventive device (10,60) has a radiation source (11;20, . . . ,29,30 . . . 39; 50,53;61) that can emit a first radiation source (16) with which the phosphor carrier (15) can be exited such that the carrier emits a second radiation (17). This second radiation (17) comprises an image of the information stored in the phosphor carrier (15). The device (10,60) additionally has a receiving means (12,62) which contains a number of point elements (PD1, . . . PDn) in order to receive the second radiation (17) emitted from the phosphor carrier (15) in a point-by-point manner. The second radiation of a point of the phosphor carrier (15) can thus be received by each one of the point elements (PD1, . . . ,PDn).

13 Claims, 4 Drawing Sheets

DEVICE FOR READING OUT INFORMATION STORED IN A PHOSPHOR-CARRIER, AND AN X-RAY CASSETTE

BACKGROUND OF THE INVENTION

The present invention relates to a read-out device for information stored in a phosphor carrier, and to an x-ray cassette. In particular, the present invention relates to a device for the line by line read out of information, such as x-ray information, stored in a phosphor carrier. The information is read out using a radiation source that can generate several individual beams, each of which stimulates the phosphor carrier such that it emits secondary radiation. The secondary radiation, which contains at least a partial reproduction of the stored information, is received at a plurality of point elements of a receiving device. The x-ray cassette includes the phosphor carrier and is designed for writing x-ray information onto this phosphor carrier.

Especially for medical purposes, x-ray radiation is used to generate an image of an object, for example a patient, where said image is stored as a latent image in a phosphor carrier. The phosphor carrier is stimulated using the radiation source to read out the x-ray image stored in the phosphor carrier. According to the stimulation, it will emit light with an intensity in proportion to the x-ray image stored in the phosphor carrier. The light emitted by the phosphor carrier is received by a detection device, causing the x-ray image stored in the phosphor carrier to be made visible. For example, the x-ray image may be presented directly on a monitor. On the other hand, it is possible to write the x-ray image on a photographic x-ray film specifically manufactured for x-ray images.

An apparatus for reading out information stored in a phosphor carrier is known from the Published European Patent Application No. EP 0 777 148 A1. In this known application, the phosphor carrier is stimulated by a laser beam. Using a very fast rotating polygon mirror and several optical lenses, the laser beam of a single laser is directed to the phosphor carrier. The apparatus described in the patent application is a so-called "flying spot" scanning device, where the laser beam reflected by the polygon mirror stimulates all points of a line of the phosphor carrier in sequence. The light emitted by the phosphor carrier due to the stimulation with the laser beam is guided by a fiber cross-section converter to a photoelectric sensor that converts the collected photons into electrical signals.

Using this apparatus, only one single point of the phosphor carrier material at a time is stimulated to emit light. To be able to read out the entire information stored in the phosphor carrier in an acceptable—that is, a relatively short—time period, the individual points of the phosphor carrier can be stimulated only briefly. A typical stimulation time for "flying spot" systems is about 6 µs for one point. Because of this brief time period of stimulation, the intensity of the laser beam generated by the laser must be very high for the individual points of the phosphor carrier to be able to emit a sufficiently strong radiation. In addition, only a relatively small amount of the stored information can be read out. This limits the attainable quality for reproducing the stored information.

The laser beam stimulating the phosphor must fulfill certain conditions with regard to spatial and spectral distribution. Such "flying spot" systems require a laser beam guidance with a length of 1.5 to 2 times the width of the line of the phosphor carrier that is to be stimulated, especially to be able to stimulate the entire width of the phosphor carrier. Focusing and guiding the laser beam requires a very sophisticated and, thus, cost-intensive system of optical components. Furthermore, these optical components require considerable space such that the instrument dimensions of such a "flying spot" system are very large.

SUMMARY OF THE INVENTION

It is a principal objective of the present invention to ensure good quality when reproducing information stored in a phosphor carrier.

This object, as well as other objects which will become apparent from the discussion that follows, are achieved, in accordance with the present invention, by providing a radiation source which includes an optical device for expanding the several individual beams in the direction of a line on the phosphor carrier.

According to the invention, the receiving device is designed such that it contains a multitude of point elements and where the secondary radiation emitted by the stimulated points of the phosphor carrier can be received, point by point, simultaneously by several of these point elements. A specified minimum energy E is required to stimulate the individual points of the phosphor carrier such that they can emit this secondary radiation. This energy is proportional to the power (intensity) of the radiation source and the dwell time of the primary radiation emitted by the radiation source at the point of the phosphor carrier to be stimulated. If several points of the phosphor carrier are stimulated at the same time, it is possible to attain a relatively long dwell time of the primary radiation for each point of the phosphor carrier, without prolonging the overall time for reading out the entire information stored in the phosphor carrier. Moreover, it is advantageously even possible to shorten this overall time for reading out the entire information stored in the phosphor carrier. Due to the long dwell time at each point of the phosphor plate, the scanning speed for stimulating the points of the phosphor plate can be kept low. Each point emits a large secondary radiation that can be detected by the receiving device.

It is possible to integrate the secondary radiation emitted by the phosphor carrier over a long time period. Since each point element of the receiving device exhibits a certain background noise, the signal to noise ratio of the point elements can be increased advantageously based on the invention. Due to the longer dwell time of the primary radiation of the radiation source per point of the phosphor carrier, it is also possible to reduce the power (intensity) that needs to be generated by the radiation source and to still generate the required energy E for stimulating the phosphor carrier.

In an advantageous embodiment of the invention, it is possible to simultaneously stimulate several points, in particular, all points that are arranged in a line of the phosphor carrier. In doing so, it is possible to stimulate a large number of points of the phosphor carrier simultaneously and at the same time keep the expenditures for the design of the radiation source and the receiving device relatively small. Thus, the required number of components in the radiation source and the receiving device can be limited. This ensures a great compactness of the device.

Advantageously, several individual beams can be generated by the radiation source, which makes simultaneous and precise stimulation of several points of the phosphor carrier simple and effective.

An advantageous design of the radiation source exhibits several laser diodes that are used for the stimulation of the several points of the phosphor carrier. Laser diodes can generate sufficient radiation power for stimulating the points of the phosphor carrier. At the same time, they are very compact, such that they are conducive for the design with small dimensions of the device subject to the invention. In addition, laser diodes are easy to control.

In a particularly advantageous design of the invention, the number of laser diodes in the radiation source is equal to the number of point elements of the receiving device. In this case, each point of the line of the phosphor carrier to be stimulated is stimulated simultaneously. The radiation source is then designed as a line of laser diodes. In this manner, it is advantageously possible to do without additional optical means for expansion and focussing of the laser diode beams. The distance between the radiation source and the phosphor carrier to be stimulated can be kept small, which further adds to the compactness of the device.

To be able to stimulate several points of the phosphor carrier with one single beam, the radiation source may be equipped with an optical system with which the single beam can be expanded in the expansion direction of a line of the phosphor carrier. In this manner, it is also advantageously possible to overlap several single beams, especially two single beams at least partially on the respective point of the phosphor carrier to be stimulated. The stimulation power to be generated by the radiation source can be reduced using this overlapping of the intensities of several individual beams. Furthermore, the read-out reliability is increased in case one single beam malfunctions. To limit the single beams despite the expansion in the expansion direction of one single line to this line, the optics provided in the radiation source is advantageously designed such that it focuses the single beams in a direction perpendicular to the direction of expansion of the line. This ensures that an unintentional stimulation of lines that are adjacent to the line to be currently stimulated is avoided.

A reproduction device can be provided between the phosphor carrier and the receiving device, which can be used to reproduce the secondary radiation emitted by the individual stimulated points of the phosphor carrier at the individual point elements of the receiving device. Advantageously, this reproduction is carried out on a 1:1 scale. In this manner, the use of a fiber cross-section converter with its disadvantageously large dimensions can be avoided. This results in a very short distance between phosphor carrier and receiving device, which in turn greatly improves the degree of compactness of the device.

Two radiation sources are provided in another particularly advantageous embodiment of the invention, where one receiving device each is assigned to said radiation sources. The two radiation sources and their associated receiving devices are arranged such that the phosphor carrier, which is designed as a phosphor plate with a top and a bottom side, can be read out from both sides. This can further increase the amount of secondary radiation to be emitted by the phosphor carrier, which in turn improves the quality of the reproduction of the information that is to be read out from the phosphor plate.

According to the invention, a device for reading out information stored in a phosphor carrier is arranged directly in an x-ray cassette that exhibits such a phosphor carrier. X-ray information stored in the phosphor carrier can then be read out directly from the device subject to the invention and provided to a control device for further processing. Advantageously, such an x-ray cassette can be integrated directly in an x-ray unit. To read out the information stored in the phosphor carrier, it is advantageously no longer required for the operating personnel to remove the x-ray cassette from the x-ray unit and insert it in a special reading device for reading out the stored information. This significantly improves the operating convenience.

In one advantageous embodiment of the x-ray cassette subject to the invention, a phosphor carrier is designed as a phosphor plate that exhibits a top and a bottom side that have coatings that are different from one another. These two different coatings exhibit different sensitivities. For example, using the coating of one side of the phosphor plate, bones can be recorded better while the coating on the other side of the phosphor plate, may be better suitable to record soft parts. This gives the operator the selection between two sensitivities based on this design of the x-ray cassette subject to the invention. This allows for increased flexibility and capability of the device subject to the invention.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
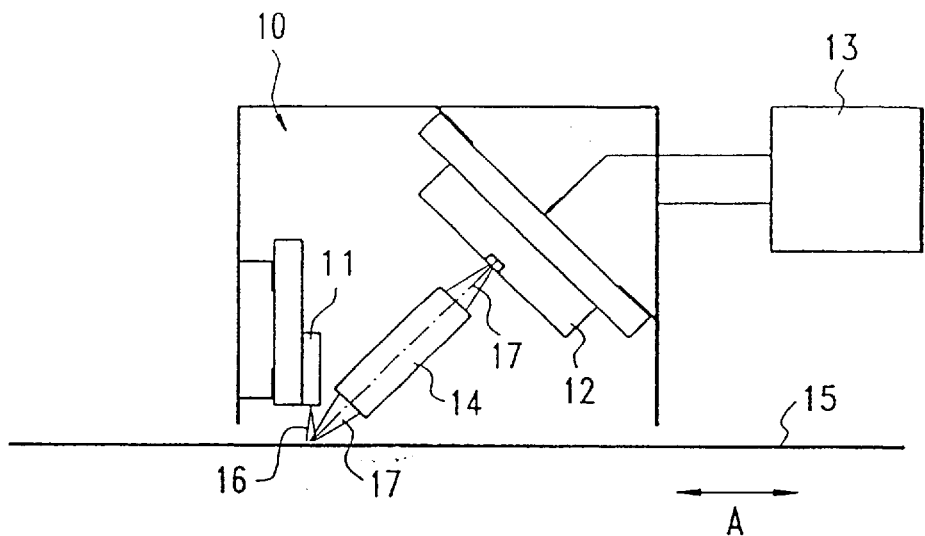
FIG. 1 is a first exemplary embodiment of a device subject to the invention for reading out information stored in a phosphor carrier in the form of a reader head.

The preferred embodiments of the present invention will now be described with reference to FIGS. 1–7 of the drawings. Identical elements in the various figures are designated with the same reference numerals.

FIG. 1 shows the first exemplary embodiment of the device subject to the invention for reading out information stored in a phosphor carrier. A reader head 10 is used to read out image information from a phosphor plate 15. X-ray radiation has been used to create this image information in the phosphor plate 15. The reader head 10 exhibits a radiation source, which is here designed as a line of laser diodes 11. The line of laser diodes 11 is positioned perpendicular to the to the phosphor plate 15 such that the radiation emitted by the individual laser diodes strikes the phosphor plate directly. The line of laser diodes 11 exhibits numerous laser diodes arranged next to one another, which, in the present exemplary embodiment, can stimulate the entire width of the rectangular phosphor plate that is capable of storing information. Here, the line of laser diodes contains 4096 laser diodes arranged parallel in one line next to one another.

Furthermore, the reader head 10 includes a receiving device, which, in the present exemplary embodiment, is designed as "Charge Coupled Device" (CCD) line 12. This CCD line 12 exhibits numerous photo detectors arranged parallel in one line next to one another. These photo detectors can be used to perform a photoelectric conversion of a received light radiation. They represent the point elements of the receiving device. Each photo detector can receive one light beam emitted from one of the stimulated points of the phosphor plate. Thus, 4096 photo detectors are provided in the CCD line 12 of the present exemplary embodiment.

A reproduction device with so-called Selfoc lenses is provided between the phosphor plate 15 and the CCD line 12. A Selfoc lens can be provided for each stimulable point of the line of the phosphor plate 15, however, this is not required for the invention. Basically, the Selfoc lens is a glass fiber that exhibits a gradient in the refractive index towards the center. Due to a total reflection, it can transmit light in a bundled manner practically without loss. Each Selfoc lens ensures that the angle of incidence of the light at the input of the Selfoc lens is the same as the angle of deflection of the light at the output. Using a one-or two-dimensional arrangement of such Selfoc lenses, an area to be reproduced, that is assigned to this arrangement, can be reproduced precisely at a 1:1 ratio onto an image area. Using a suitable arrangement of such Selfoc lenses, the light emitted by one of the stimulated points of the phosphor plate 15 can be reproduced in a simple manner and very precisely on the assigned photo detector of the CCD line 12. Micro lens arrays may be used in place of the Selfoc lenses.

At its output, the CCD line 12 is connected to a data processing unit 13. The task of the data processing unit 13 is to evaluate and process the electrical signals, generated by the CCD line 12 and containing a reproduction of the image information stored in the phosphor plate 15, as well as to control the radiation source 11, particularly its advance for line-by-line read-out of the phosphor plate 15. In the data processor 13, the electrical signals generated by the CCD line 12 undergo analog/digital conversion. Thereafter, the digital image data obtained in this manner can then be processed by a digital signal processor using algorithms that have been stored in the data processing unit 13. In particular, the digital signal processor can calculate correction values and the individual digital image data of the image information can undergo a correction procedure. In this manner, short and long term fluctuations of individual components of the reader head 10 subject to the invention or of the phosphor plate 15 can be taken into account that would otherwise lead to errors or distortions when reproducing the image information stored in the phosphor plate. Such short or long term changes may be, for example, performance fluctuations of the laser diodes in use due to temperature fluctuations or aging. It is also possible that the phosphor plate 15 has irregularities that could falsify the light radiation emitted by the phosphor plate 15. It is possible to perform the corrections carried out by the data processing unit 13 depending on the type of error to be corrected prior to each reading cycle or at greater intervals.

Due to the stimulation of several points of the phosphor plate 15 according to the invention, particularly of all points of one of the lines of the phosphor plate 15, it is possible to provide a dwell time of about 1 ms of the primary radiation per point of the phosphor carrier 15. The power to be generated by one laser diode can then be about one milliwatt.

The size of the line of the phosphor plate 15 and the size of its stimulable points are determined by the cross-section of the laser diode beam that stimulates the individual points of the phosphor plate 15 and by the size of the light-receiving area of the individual photo detectors.

During operation, the laser diode line 11 emits a primary radiation 16 to stimulate the points of a line of the phosphor plate 15, where said primary radiation consists of 4096 individual laser diode beams based on the laser diode line 11, which is made up of 4096 laser diodes. Thus, with these 4096 individual laser diode beams, 4096 individual points can be stimulated to radiation in a line of the phosphor plate 15. The laser diodes of the laser diode line 11 have a center-to-center distance of about 80 μm. An optical device for focusing the laser diode beams is not required because the distance between the laser diode line 11 and the phosphor plate 15 is very small (preferably<0.5 mm). The expansion of the individual laser diode beams is so insignificant that adjacent points of the phosphor plate 15 are generally not stimulated. Thus, the center-to-center distance of two laser diodes in the laser diode line 11 basically corresponds to the distance between two stimulated points on the phosphor plate 15.

The points of the phosphor plate 15 stimulated due to the primary radiation 16 emit a secondary radiation 17 that is reproduced on the individual photo detectors of the CCD line 12 by the Selfoc lenses of the Selfoc lens line 14. The CCD line 12 performs the photoelectric conversion of the received light emitted by the phosphor plate 15 in a known manner and transmits the generated electrical signal containing the reproduction of the image information stored in the phosphor plate 15 to the data processing unit 13 for further processing.

By stimulating all points of a line of the phosphor plate 15, the bandwidth B is reduced, which in turn reduces the noise power P, which is proportional to the bandwidth B according to the following equation:

$$P=4*k*T*B,$$

where T=absolute temperature and k=Boltzmann's constant.

Figure 2:
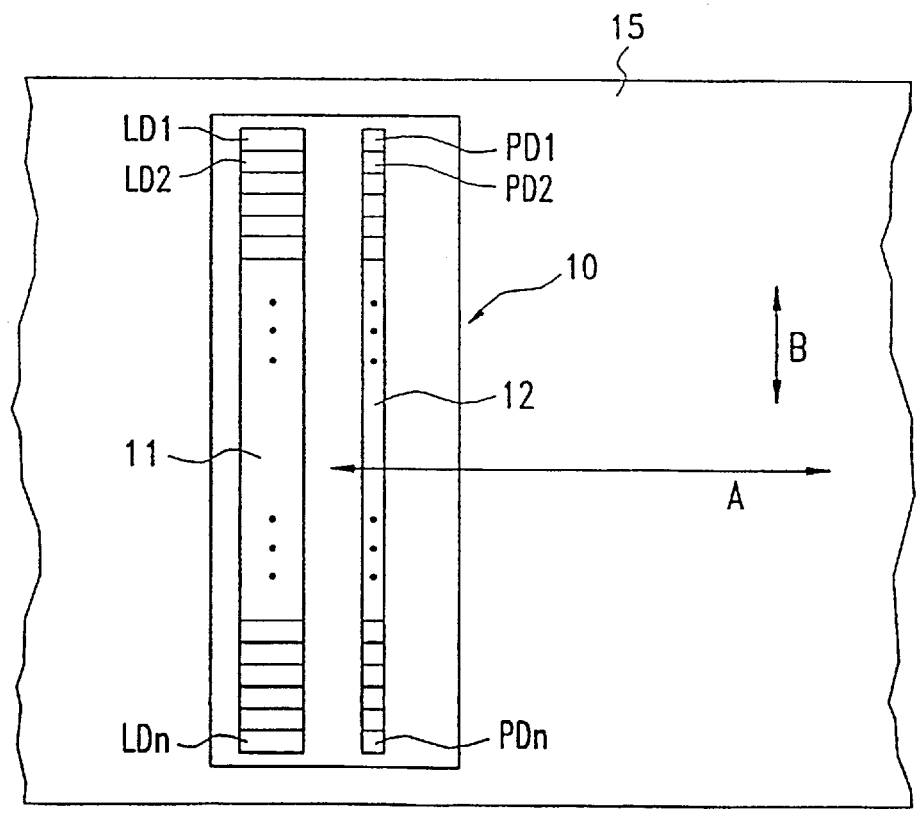
FIG. 2 shows another view of the first exemplary embodiment of the reader head subject to the invention.

FIG. 2 shows an additional view of the reader head 10 subject to the invention according to the first exemplary embodiment. FIG. 2 shows an over-head view of the reader head subject to the invention and the phosphor plate 15. The reader head 10 is shown in a sectional view. The reader head 10 spans the entire width of the phosphor plate 15 where information may be stored. FIG. 2 shows schematically the laser diode line 11 with laser diodes LD1 to LDn arranged parallel next to one another. Also shown is the CCD line 12 with photo detectors PD1 to PDn arranged parallel next to one another. In this exemplary embodiment, the laser diode line 11 contains 4096 laser diodes and the CCD line 12 contains 4096 individual photo detectors; thus n=4096. The reader head 10 can be moved back and forth in a travel direction A. In this manner, the lines of the phosphor plate 15 can be scanned in sequence and the image information stored in the various lines of the phosphor plate 15 can be read out. Instead of the reader head 10, it is also possible to design the phosphor plate 15 such that it can moved back and forth in the travel direction A.

Figure 3:
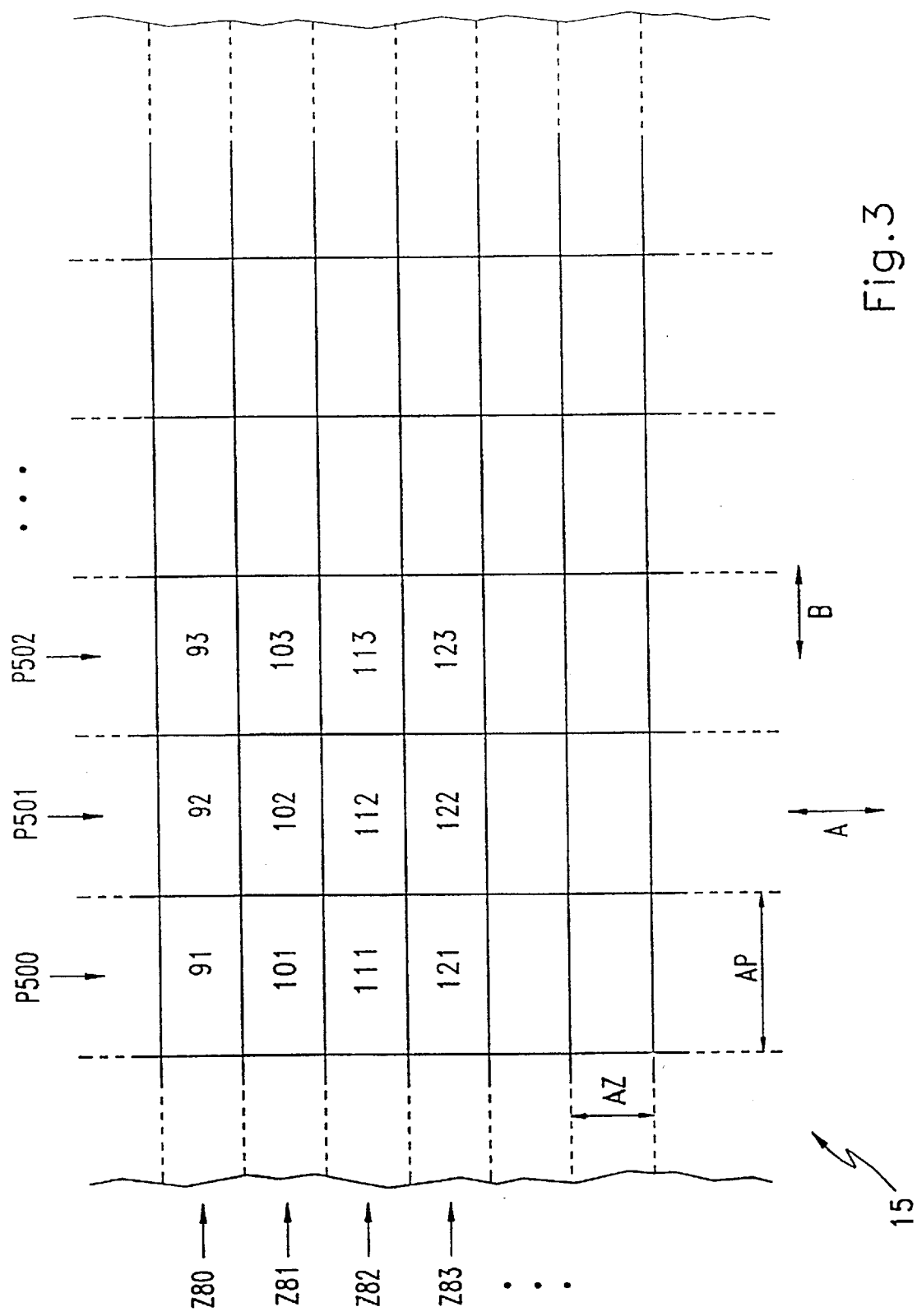
FIG. 3 shows an example of a schematic presentation of the arrangement of the phosphor plate in lines and points.

FIG. 3 shows an example of a schematic presentation of the division of the phosphor plate 15 according to lines and points of these lines as they are specified according to the pattern of the sizes of the stimulating laser diode beams and the light-receiving areas of the photo detectors of the CCD line 12. A line length AZ specifies the length of a line of the phosphor plate 15 in the travel direction A of the reader head 10. Here, this length AZ is determined by the cross-section of the stimulating laser diode beam. Here, the length AZ of the lines is about 20 μm. At the same time, this line length AZ also specifies the length of one of the points of the line.

A point width AP specifies the width of a point of the line in the line direction B. Here, this width AP is specified by the light-receiving area of one of the photo detectors of the CCD line 12. Here, it is about 80 μm.

Representing the lines of the phosphor plate 15, FIG. 3 shows four consecutive lines Z80, Z81, Z82 and Z83. The first line Z80 includes three points 91, 92, and 93 among others. The second line Z81 includes three points 101, 102 and 103, among others. The third line Z82 includes three points 111, 112 and 113, among others, and the fourth line Z83 includes three points 121, 122 and 123, among others. The points of the lines are arranged underneath one another such that they form various rows P500, P501 and P502 of points that are all assigned to different lines. In the example of FIG. 3, the points 91, 101, 111 and 121 are contained in the first row P500, the points 92, 102, 112 and 122 in the second row P501, and the points 93, 103, 113 and 123 in the third row P502. The points that are arranged in one of the rows underneath one another and that each belong to different lines are here designated as the same points of the different lines.

To improve the signal-to-noise ratio, the intensities of the secondary radiation from several points arranged underneath one another of several neighboring lines can be integrated, i.e., combined, by the data processing unit 13 after their stimulation. The mean value is then calculated from these integrated intensities. This mean value then determines the reproduction of the points of the row combined in this manner. In the present exemplary embodiment, the points of the four lines Z80, Z81, Z82 and Z83 that are underneath one another in the various rows are combined. This means that the received radiation intensities of points 91, 101, 111, and 121 of the first row P500, those of points 92, 102, 112 and 122 of the second row P501, those of points 93, 103, 113 and 123 of the third row P502, etc. are combined with subsequent calculation of the mean value. In this manner, the same points, each with a length of 20 μm, of four lines are combined to one "large" point, which then exhibits a length of about 80 μm in the travel direction A. The accepted disadvantage is that the resolution for reproducing the stored image information is reduced. However, the effects of noise sources, such as the x-ray noise when writing to the phosphor plate, the light photon noise when reading out the phosphor plate or the phosphor plate noise can be reduced in this manner.

In place of a laser diode line that spans the entire width of the phosphor plate 15, it is also possible to use a radiation source with laser diodes that stimulates only a portion of a line of the phosphor plate 15 to light. However, to read out the image information stored in the entire line of the phosphor plate 15, it is then necessary to shift this radiation source in the expansion direction B of the line.

Figure 4:
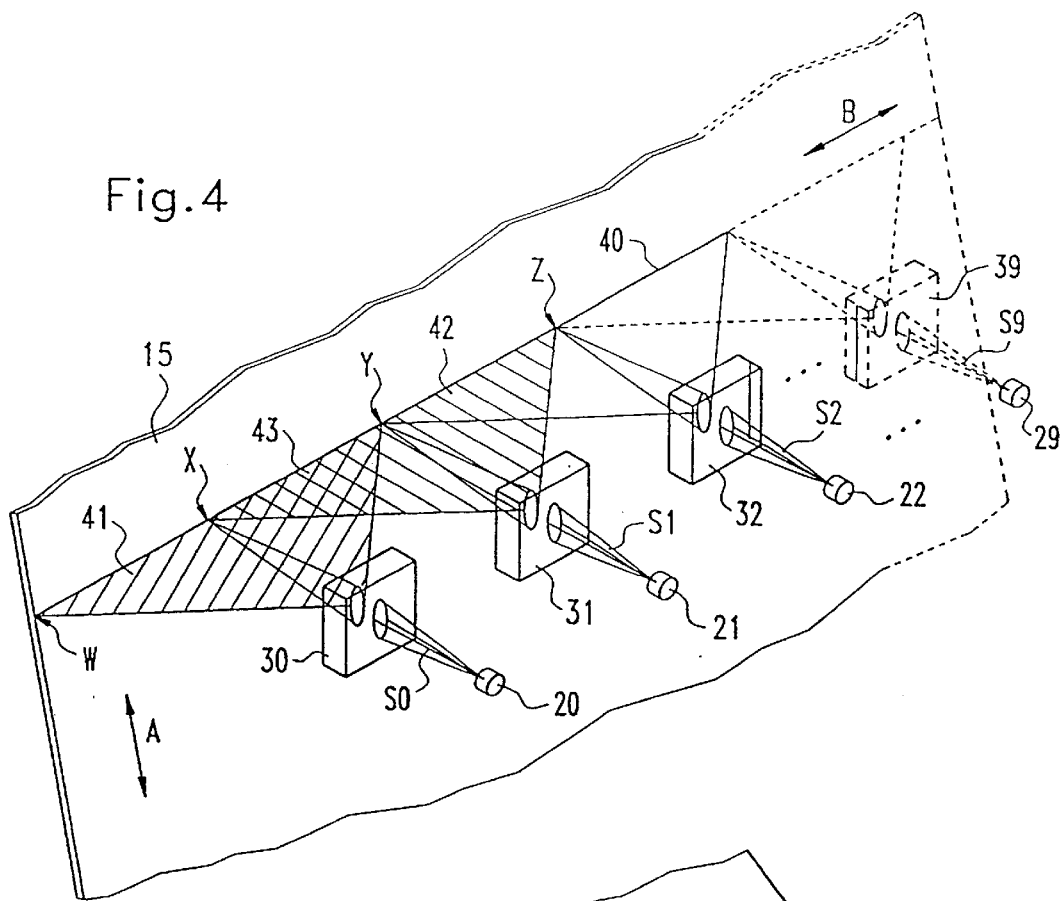
FIG. 4 is a second exemplary embodiment of the device subject to the invention.

FIG. 4 shows a second exemplary embodiment of the device subject to the invention. It exhibits numerous laser diodes 20 to 29 whose laser diode beams S0 to S9 are reproduced on the phosphor plate 15 via reproduction optical devices 30 to 39. Each one of the reproduction optical devices is assigned to one laser diode. For simplicity's sake, the reproduction optical devices can be realized using cylinder lenses, for example. In this exemplary embodiment, each laser diode 20 to 29 is used to stimulate several points of the phosphor plate. For this purpose, the reproduction optics device 30 to 39 assigned to their respective laser diode 20 to 29 expands the respective laser diode beam S1 to S9 in the expansion direction B of the line to be stimulated. FIG. 4 shows a line 40 stimulated by the expanded laser diode beams S0 to S9. Furthermore, FIG. 4 shows a primary radiation field 41 representing the radiation fields of all laser diodes 20 to 29, where said radiation field, is created by the first laser diode 20 using the reproduction optical device 30 assigned to this first laser diode 20. The reproduction optical device 30 expands the laser diode beam S1 of the laser diode 20 in the expansion direction B of line 40. Thus, a border of the primary radiation field 41 runs on line 40 from a first point W to a third point Y. The laser diode beam S0 of the laser diode 20, which has been expanded by the reproduction optical device 30, is also focussed by this reproduction optical device 30 in the direction A that is perpendicular to the expansion direction B of the line and that corresponds to the travel direction of the reader head subject to the invention for scanning the phosphor plate 15. This ensures that only points of line 40 that is to be stimulated is stimulated to light by the primary radiation field 41. These points are located between the first point W and the third point Y.

FIG. 4 also shows a second representative beam field 42, which is created by a second reproduction optical device 31 by expanding and focussing an additional laser diode beam S1 that originates from a additional laser diode 21. This additional laser diode beam S1 is also expanded by optical device 31 in the expansion direction B of line 40 and is focussed in the travel direction A of the reader head. Thus, the second beam field 42 stimulates those points of line 40 that are located between a second point X and a fourth point Z. The second point X is located exactly in the center between the first point W and the third point Y.

This arrangement creates an overlapping field 43, where the first beam field 41 and the second beam field 42 overlap. The intensity of the overlapping field 43 is, therefore, approximetly twice is strong as the individual intensities of the first and second beam fields 41 and 42, respectively.

The uniform arrangement of the individual laser diodes 20 to 29 and the reproduction optical devices 30 to 39 assigned to them ensures that each point of line 40 that is to be stimulated is stimulated by the expanded and focussed laser diode beams of two laser diodes. In this manner, it is advantageously possible to increase the functional reliability of this radiation source, because a stimulation of all points of line 40 that are to be stimulated is ensured even if one of the laser diodes 20 to 29 were to malfunction. The intensity of the stimulating radiation is however reduced in the respective effected area if one of the laser diodes 20 to 29 malfunctions, thus making detection of the malfunction possible. The data processing unit that performs the processing of the digital image data after the receiving device detects and converts the light into electrical signals can then correct the digital image data that is erroneous due to the malfunction.

Alternative to the exemplary embodiment of FIG. 4, it is also possible to overlap more than two laser diode beams on one point each of the line to be stimulated. This can further improve the reliability in case of malfunction. Furthermore, the number of laser diodes of the radiation source can be altered. It is not limited to ten laser diodes as described in this exemplary embodiment.

Figure 5:
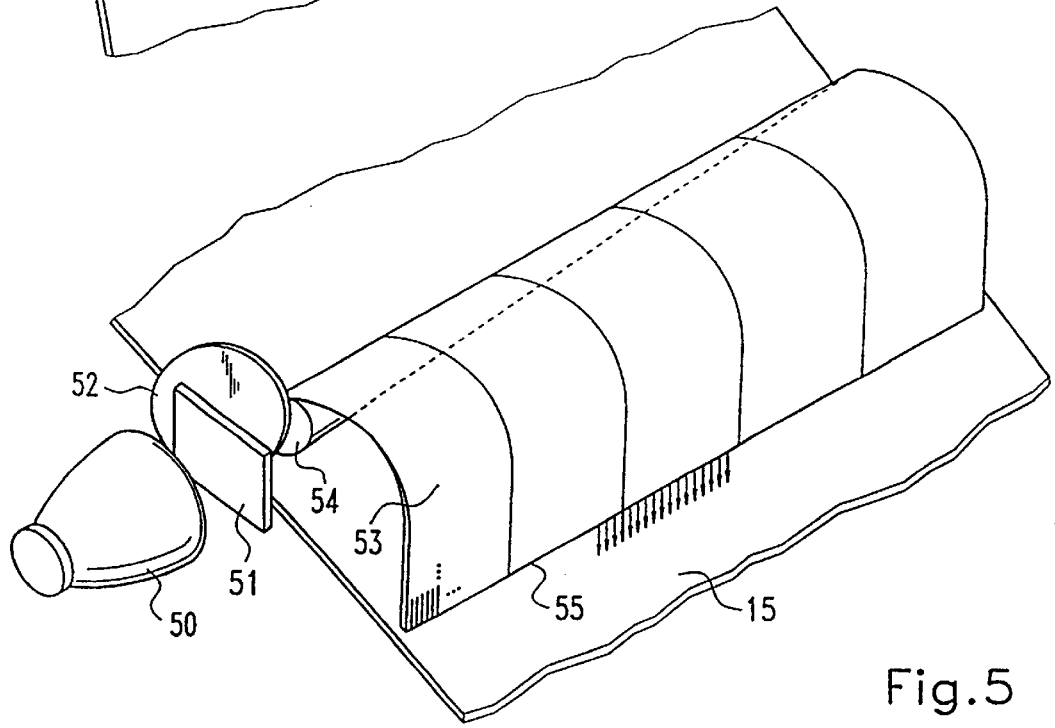
FIG. 5 is a third exemplary embodiment of the device subject to the invention.

FIG. 5 shows a third exemplary embodiment of the device subject to the invention. In this third exemplary embodiment, the radiation source exhibits a thermal light source in the form of a halogen lamp 50. However, it is also possible to use a gas discharge lamp or any other light source with spontaneous light emission. The light of the halogen lamp 50 is coupled into a fiber cross-section converter 53 via a filter 51 that provides a suitable adaptation of the wave length range used for the stimulation of the phosphor plate 15. For this purpose, a thin glass fiber is coiled in one layer and roundly bundled at its one end 54. The output area at the other end 55 of the cross-section converter 53 is advantageously reproduced via a suitable optical unit in the reproduction plane on the line of the phosphor plate 15 to be stimulated or is arranged closely above this line to be stimulated.

A shutter 52 that can be used to quickly and directly control the coupling time of the light into the fiber cross-section converter 53 is provided between the input of the cross-section converter 53 and the filter 51.

A reason for using the halogen lamp 50 is that a high light power can be advantageously achieved. Furthermore, this halogen lamp 50 can also be used to erase a phosphor plate 15 that has previously been written to using the x-ray.

Instead of the use of a thermal light source, such as the halogen lamp of the third exemplary embodiment, or the use of laser diodes according to the first and second exemplary embodiment, a filament lamp may be used as the radiation source, where the filament is used as the beam emitting area. Using a suitable spectral filter, the emitting area of this filament can be reproduced in the flat phosphor plate without additional optical conversion. This can result in a very compact design. However, with regard to its emission properties, the filament lamp must meet the requirements concerning line width, length and uniformity of the area of the phosphor plate with the points to be stimulated.

Furthermore, it is also possible to use so-called light emitting diodes (LED), if they achieve sufficient emission energy. Advantageously, LEDs can also be used in the line form.

Figure 6:
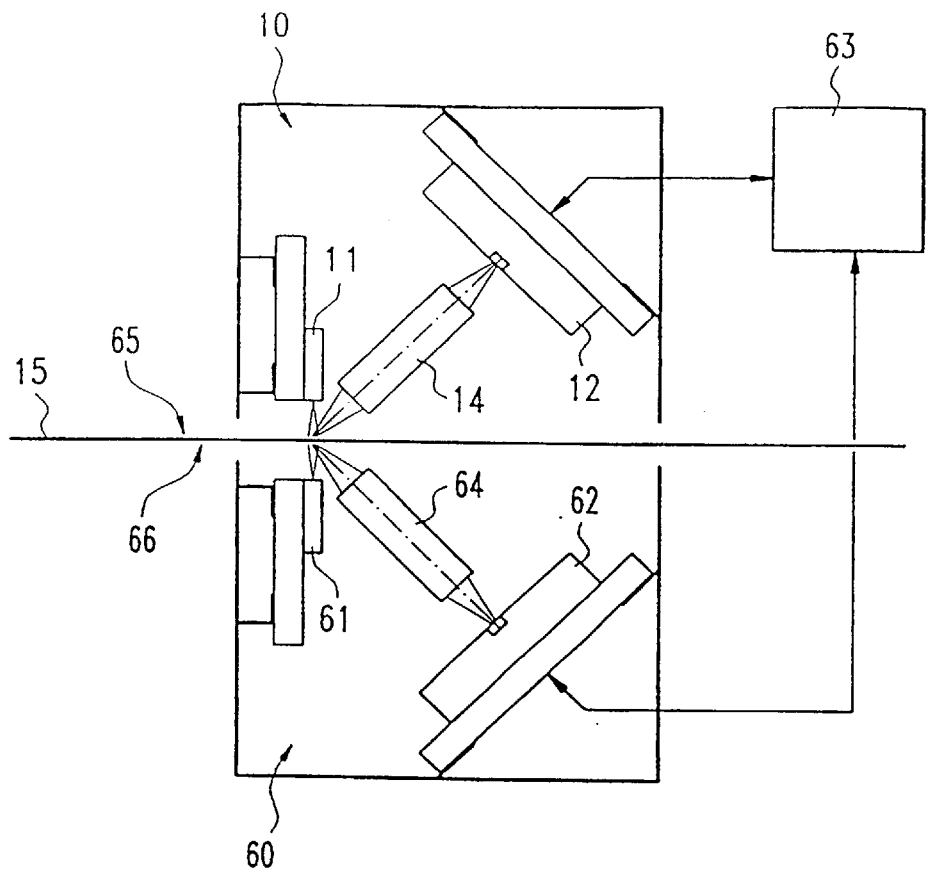
FIG. 6 is a fourth exemplary embodiment of the device subject to the invention with two reader heads.

FIG. 6 show a fourth exemplary embodiment of the device subject to the invention. In this exemplary embodiment, the phosphor plate 15 is provided with a first coating on its top side 65, where this first coating differs from a second coating that is applied to the bottom side 66 of the phosphor plate 15. The coatings of the top side 65 and of the bottom side 66 of the phosphor plate 15 have sensitivities that are different from one another. In this manner, x-rayed objects that exhibit significantly different contrasts such as bones and soft parts, for example, can be reproduced with very good quality using the same phosphor plate.

The device subject to the invention according to FIG. 6 exhibits two reader heads 10 and 60 for reading the phosphor plate 15. In their design, the two reader heads 10 and 60 correspond to the that of reader head 10 that has already been described above based on the first exemplary embodiment according to FIGS. 1 and 2. Thus, the two reader heads 10 and 60 each exhibit a laser diode line 11 or 61, respectively, for stimulating the points of the phosphor plate 15. Furthermore, they each contain a CCD line 12 or 62, respectively, for receiving the radiation emitted by the stimulated points of the phosphor plate 15 with the radiation being reproduced on the associated CCD lines 12 or 62, respectively, using a Selfoc lens line 14 or 64, respectively. The electrical signals being generated by the two CCD lines 12 or 62, respectively, and containing a reproduction of the image information stored in the phosphor plate 15 are transmitted to a common data processing unit 63. This data processing unit 63 controls the functionality of the two reader heads 10 and 60. For example, it may specify whether one of the two reader heads, 10 or 60 or both together are to be used to read out the image information contained in the phosphor plate 15. The electrical signals transmitted by the two CCD lines 12 and 62 are combined in the data processing unit 63 to a total image. In doing so, the two signals may be weighted differently.

Through the possibility of reading out on both sides of the phosphor plate 15 an additional improvement of the reproduction of the read out image information can be achieved. The main reason for this is simply that more information stored in the phosphor plate can be read out. Advantageously, the scattering of the stimulation radiation that is generated when the stimulation radiation enters the phosphor plate 15 that is coated on both sides can be kept small in comparison to a single reader head that is located on one of the sides of the phosphor plate 15 and that reads the image information from the phosphor plate that is coated on both sides. This can significantly reduce the blurring of the read out image information due to scatter radiation.

The radiation sources described above for stimulating the individual points of the phosphor plate 15 can also be used in place of the two laser diode lines 11 and 61.

Figure 7:
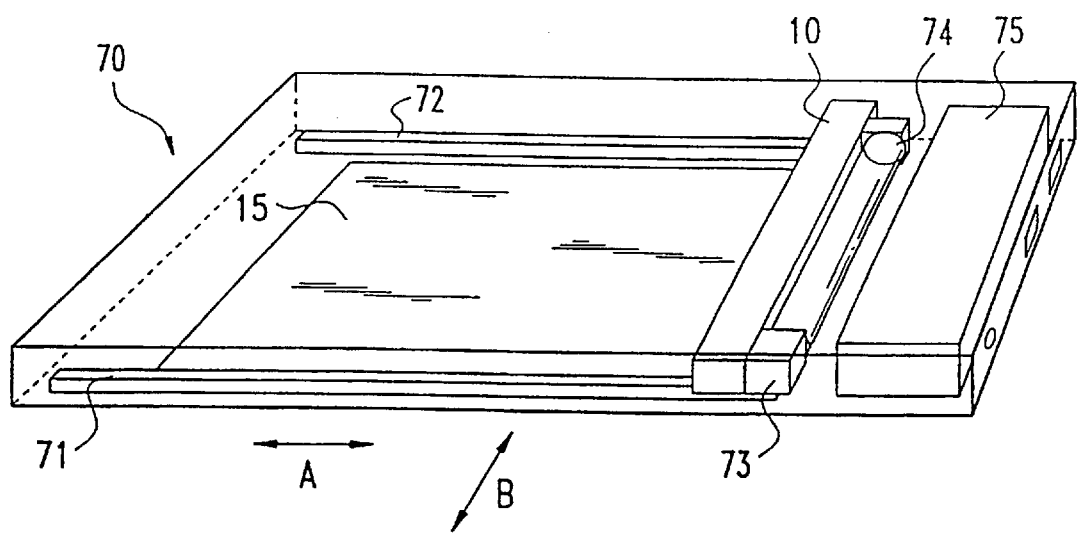
FIG. 7 is an exemplary embodiment of an x-ray cassette subject to the invention.

FIG. 7 shows an exemplary embodiment of an x-ray cassette 70 subject to the invention that exhibits a device subject to the invention for reading out information stored in a phosphor carrier. In the present exemplary embodiment, the reader head 10 that has already been described above based on the first exemplary embodiment under FIGS. 1 and 2 constitutes such a device subject to the invention. The x-ray cassette 70 subject to the invention additionally exhibits the phosphor plate 15, where the information that is to be read out by the reader head 10 can be stored. Guide bars 71 and 72 that supply the drive and guidance of the reader head 10 are provided along the two longitudinal sides of the phosphor plate 15. Advantageously, the reader head 10 may be driven by a linear motor 73 such that the reader head can be guided line by line across the phosphor plate 15 in the travel direction A. A control device 75 is provided in the x-ray cassette for the precise control of the linear motor 73 drive. Here, the two guide bars 71 and 72 are used as reaction components for the linear motor 73. By using the linear motor 73 for the drive of the reader head 10, the use of complex power transmission from a conventional electrical motor with a rotating shaft to the reader head 10 that causes inaccuracies can be avoided.

An erasing lamp 74 that is also guided across the phosphor plate 15 by the linear motor 73 in order to erase image information stored in the phosphor plate is provided alongside behind the reader head 10. Advantageously, the reader head 10 and the erasing lamp 74 are moved across the phosphor plate 15 by the same linear motor 73.

Such an x-ray cassette subject to the invention can be inserted directly into a x-ray table such that removal of the x-ray cassette for reading out the image information stored in it is not required. The x-ray cassette 70 exhibits interface ports that can be used to transfer digital data generated in the reader head 10 to a monitor or printer.

Due to the design subject to the invention of the device for reading out information stored in a phosphor carrier, the x-ray cassette can be manufactured with very small dimensions. It is possible to limit the thickness of the x-ray cassette to about 45 mm such that it can even be insertable in conventional x-ray units already in operation.

There has thus been shown and described a novel device for reading out information stored in a phosphor carrier, and an x-ray cassette, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a device for the line by line read out of information stored in a phosphor carrier with a radiation source that can generate several individual beams, for emitting a primary radiation that can stimulate the phosphor carrier such that it emits a secondary radiation that contains at least a partial reproduction of the stored information, and a receiving device for point by point reception of the secondary radiation emitted by the phosphor carrier, wherein the receiving device includes a multitude of point elements and wherein the secondary radiation that is emitted by the phosphor carrier can be received at the same time by a plurality of these point elements, the improvement wherein the radiation source includes an optical device for expanding the several individual beams in the direction of a line on the phosphor carrier.

2. The device as set forth in claim 1, wherein the radiation source includes a light source with spontaneous light emission and a fiber cross-section converter.

3. The device as set forth in claim 2, wherein the light source is a halogen lamp.

4. The device as set forth in claim 2, wherein the light source is a gas discharge lamp.

5. The device as set forth in claim 1, wherein the optical device focuses the individual beams in a direction (A) perpendicular to the direction (B) of a line.

6. The device as set forth in claim 1, further comprising reproduction means, located between the phosphor carrier and the receiving device, for imaging the secondary radiation emitted by the individual points of the phosphor carrier in a ratio of 1:1 on the individual point elements.

7. The device as set forth in claim 1, wherein said device includes two radiation sources and two receiving devices that are arranged such that the information stored in the phosphor carrier, which comprises a phosphor plate having a top side and a bottom side, can be read out both from the top side and from the bottom side of the phosphor plate.

8. The device as set forth in claim 1, wherein said device includes an evaluation means for evaluating the secondary radiation that is received point by point by the receiving device, wherein said evaluation means includes means for combining the intensities of the secondary radiation of the same points of several adjacent lines that have been read out and received point by point, and for calculating a mean value of such intensities.

9. An X-ray cassette for writing to a phosphor carrier contained in the cassette, the improvement wherein the cassette includes a radiation source for emitting a primary radiation that can be used to stimulate the phosphor carrier such that it emits a secondary radiation for line-by-line read out of information stored in the phosphor carrier, wherein said secondary radiation contains at least a partial image of the stored information, and wherein the cassette includes a receiving device for point-by-point reception of the secondary radiation emitted by the phosphor carrier, wherein the receiving device contains a multitude of point elements and where the secondary radiation emitted by the phosphor carrier can be received by several of these point elements at the same time.

10. The X-ray cassette as set forth in claim 9, wherein the phosphor carrier comprises a phosphor plate having a top side and a bottom side, and wherein the top side has a coating that is different from that on the bottom side.

11. The X-ray cassette as set forth in claim 9, wherein the cassette includes a linear drive for moving the radiation source and the receiving device across the phosphor carrier.

12. The X-ray cassette as set forth in claim 11, wherein the cassette includes an erasing device for erasing the information stored in the phosphor carrier, and wherein the erasing device is arranged such that it can be moved across the phosphor carrier by the linear drive.

13. The X-ray cassette as set forth in claim 11, wherein the linear drive includes an electric motor.

* * * * *

UNITED STATES PATENT AND TRADEMARK OFFICE
CERTIFICATE OF CORRECTION

PATENT NO. : 6,373,074 B1  
DATED : April 16, 2002  
INVENTOR(S) : Juergen Mueller et al.

It is certified that error appears in the above-identified patent and that said Letters Patent is hereby corrected as shown below:

<u>Title page,</u>
Item [73], Assignee, change "Agfa-Fevaert" to -- Agfa-Gevaert --

Signed and Sealed this

Eleventh Day of June, 2002

*Attest:*

*Attesting Officer*

JAMES E. ROGAN
*Director of the United States Patent and Trademark Office*